United States Patent [19]
Meyer

[11] Patent Number: 5,890,800
[45] Date of Patent: Apr. 6, 1999

[54] METHOD AND DEVICE FOR THE DIVISION OF ELEMENTS OF A GALOIS FIELD

[76] Inventor: Jacques Meyer, 20 chemin de la croix Montfleury, Corenc, France, 38700

[21] Appl. No.: 948,741

[22] Filed: Oct. 10, 1997

[30] Foreign Application Priority Data

Oct. 11, 1996 [FR] France .................................. 96 12591

[51] Int. Cl.[6] ....................................................... G06F 7/00
[52] U.S. Cl. .......................................................... 364/746.1
[58] Field of Search .................................. 364/746.1, 761

[56] References Cited

U.S. PATENT DOCUMENTS

| | | | |
|---|---|---|---|
| 4,975,867 | 12/1990 | Weng ..................................... | 364/746.1 |
| 4,994,995 | 2/1991 | Anderson et al. .................... | 364/746.1 |
| 5,379,243 | 1/1995 | Greenberger et al. ............... | 364/746.1 |
| 5,467,297 | 11/1995 | Zook .................................... | 364/746.1 |
| 5,742,534 | 4/1998 | Monier ................................. | 364/746.1 |

FOREIGN PATENT DOCUMENTS 62-048812   3/1987   Japan .

OTHER PUBLICATIONS

IEEE Transactions on Very Large Scale Integration (VLSI) Systems, vo. 4, No. 1, Mar. 1996 "Finite Field Inversion Over The Dual Basis".

Electronics Letters, vol. 32, No. 17, Aug. 1996 Fast Normal Basis Inversion In GF (2^m).

*Primary Examiner*—Tan V. Mai
*Attorney, Agent, or Firm*—Wolf, Greenfield & Sacks, P.C.

[57] ABSTRACT

Disclosed is a method and a corresponding circuit to compute the result of the division, in a Galois field of $2^n = N$ elements, of a first number A by a second number B, these numbers being encoded on n bits, wherein said method comprises the following steps:

a—the production of a first intermediate number $S(1)$ encoded on n bits by the squaring of the first number A, b—the production of a second intermediate number $R(1)$ encoded on n bits by the multiplication of the intermediate number $S(1)$ by the number B, c—the performance n−2 times of the steps a and b, the intermediate numbers produced by multiplication $R(j)$ being successively squared, and the intermediate numbers produced by squaring $S(j)$ being successively multiplied by the second number B, and d—the production of the result $S(n)$ by the squaring of the intermediate number $R(n-1)$ produced by the [n−1]th multiplication.

40 Claims, 1 Drawing Sheet

METHOD AND DEVICE FOR THE DIVISION OF ELEMENTS OF A GALOIS FIELD

BACKGROUND OF THE INVENTION

1. Field of the Invention

The invention relates to circuits used to perform computations on the elements of a Galois field denoted GF($2^n$) and especially a circuit enabling computation of operations of division in such a field.

2. Description of the Prior Art

A Galois field is a finite set of binary numbers used, for example, to correct errors in data transmission implementing Reed-Solomon encoding and decoding operations. The set of binary numbers of n bits, n being an integer, forms a Galois field of $2^n$=N elements, on which an internal addition and multiplication are defined, i.e. in such a way that the sum or the product of two numbers of the field is also a number of the field. The addition of two numbers consists of the performance of an XOR (or Exclusive-OR) operation bit by bit between these two numbers. The result thereof is that if any element x of the field is considered, then x+x=2.x=0. The multiplication is a standard multiplication of two binary numbers of n bits so long as it generates no carry value, namely so long as the result includes no bits at 1 with a place value greater than n−1. Once a carry value is generated, it is combined by an XOR operation with predetermined bits of the bits with place values 0 to n−1 defined by a polynomial known as the Galois field generator polynomial.

Any non-zero element of the Galois field is a power of another element of this field that is not zero and not unity. In a Galois field with N+1 elements, these power values are defined modulo-N, namely $x^i = x^{i+N}$, with x as an element of the Galois field that is not zero and not unity and i as a positive or negative integer. The elements of a Galois field of N+1 elements are 0, $\alpha^0, \alpha^1, \ldots, \alpha^{N-1}$. The elements $\alpha^0$ to $\alpha^{N-1}$ are the numbers $2^0, 2^1, \ldots 2^{n-1}$ constituting the base of the binary numbers of n bits.

In certain applications, it becomes necessary to perform operations of division. Thus, for example, to compute correction coefficients in a Reed-Solomon decoder, it is necessary to compute ratios A/B where A and B are numbers computed by the decoder and capable of assuming any value. At present, there are no simple dividers that can be used to perform a division directly. To compute A/B, A is generally multiplied by the reciprocal of B.

To compute a reciprocal, generally, a table of reciprocals is used. This table is stored in a ROM memory dedicated to this use. However the use of a ROM memory does not lend itself well to an integration with the other processing circuits in present-day techniques for the designing of integrated circuits. With these techniques, the ROM memory must be placed outside a zone in which the other elements of the processing circuit are integrated. This leads to a substantial loss of surface area even if this ROM memory takes up a relatively small surface area (for example if 8 bits words are used, the memory will contain 256 words, which is little).

SUMMARY OF THE INVENTION

It is an object of the invention to propose a method for the division of elements of a Galois field that does not require any ROM memory. Another object of the invention is to propose a division circuit that implements this method and takes up very little surface area, and can be easily implemented in terms of arrangement and automatic routing.

Thus, the invention proposes a method to compute the result of the division, in a Galois field of $2^n$=N elements, of a first number A by a second number B, these numbers being encoded on n bits, wherein said method comprises the following steps:

a—the production of a first intermediate number S(1) encoded on n bits by the squaring of the first number A, b—the production of a second intermediate number R(1) encoded on n bits by the multiplication of the first intermediate number S(1) by the second number B, c—the performance n−2 times of the steps a and b, the intermediate numbers produced by multiplication R(j), with j as an index that varies from memory 2 to n−1, being successively squared, and the intermediate numbers produced by squaring S(j) being successively multiplied by the second number B, and d—the production of the result S(n) by the squaring of the intermediate number R(n−1) produced by the [n−1]th multiplication.

The invention also relates to a division circuit for the division, in a Galois field with $2^n$=N elements, of a first number A by a second number B, these numbers being encoded on n bits. The circuit comprises a squaring device receiving, from a multiplexing circuit, the first number A or a first intermediate number R(j) encoded on n bits obtained by the multiplication of exponents of the first and second number. The squaring device produces a second intermediate number S(j) encoded on n bits. The circuit finally includes a multiplier to multiply the second intermediate number by the second number and to produce the first intermediate number, and a register to store the first or second intermediate number in order to isolate the squaring device and the multiplier.

BRIEF DESCRIPTION OF THE DRAWINGS

Other advantages and particular features shall appear from the following description of an exemplary embodiment of the invention, to be read along with the appended drawings, of which

MORE DETAILED DESCRIPTION

Let us take a Galois field of $2^n$=N elements with n as a natural number. Let A and B be two numbers of this field, encoded on n bits. It will be assumed for example that n=8 bits. We then have N=256.

The method according to the invention can be used to perform the division of A by B. To do so, the following steps are implemented:

1—the production of an intermediate number $S(1)=A^2$, encoded on n bits, by squaring the number A, 2—the production of an intermediate number $R(1)=A^2*B$, encoded on n bits, by multiplying the intermediate number S(1) by the number B, 3—the production of an intermediate number $S(2)=A^4*B^2$ encoded on n bits by squaring the number R(1), 4—the production of an intermediate number $R(2)=A^4*B^3$, encoded on n bits, by the multiplication of the number S(2) by the number B, 5—let j be an index varying from 3 to n−1=7 and $K=2^{j-1}$: implementation n−3=5 times the steps 3 and 4, the intermediate numbers produced by multiplication $R(j)=(A^{2K}*B^{2K-2})*B=A^{2K}*B^{2K-1}$ being successively squared and the intermediate numbers produced by squaring $S(j)=(A^K*B^{K-2})^{2K}*B^{2K-2}$ being successively multiplied by the second number B, and 6—the production of the result $S(n)=S(8)=A^{N}*B^{N-1}=A*B^{-1}=A/B$, encoded on n bits, by squaring the intermediate number R(n−1) produced by the [n−1]th multiplication.

Figure 1:
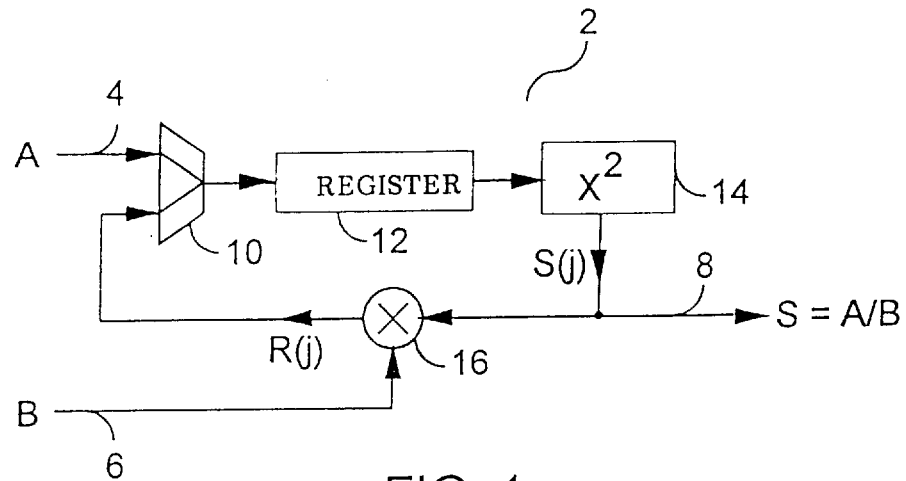
FIG. 1 shows a circuit according to the invention, and FIG. 2 gives a schematic view of squaring device for the squaring of a number encoded on 8 bits.

FIG. 1 illustrates a circuit 2 used to implement the above method. It has an input 4 to receive the number A, an input 6 to receive the number B and an output 8 to give the result S(n)=A/B.

A squaring device 14 enables the production of the intermediate numbers S(1), S(2), . . . , S(7) and the result S(8). A multiplier 16 is used to produce the intermediate numbers R(1), R(2), . . . , R(7) by multiplying the intermediate numbers S(1), S(2), . . . , S(7) by the number B and keeping only the less significant bits of the result. A register 12 placed between the multiplier 16 and the squaring device 14 enables the storage of the numbers produced by the multiplier and the isolation of the circuits 16 and 14 in order to prevent the creation of an unstable looped circuit. For, in this way the input of the squaring device is stable during the squaring of a number received by this squaring device. It will be noted that the register could be positioned differently in the loop consisting of the squaring device 14 and the multiplier 16, for example between the output of the squaring device and the multiplier. A multiplexer 10 is placed between the input 4 and the register 12. It receives the number A and the numbers produced by the multiplier and gives these numbers selectively to the register. During the first step, the multiplier gives the number A. During the subsequent steps, it gives the numbers produced by the multiplier.

Figure 2:
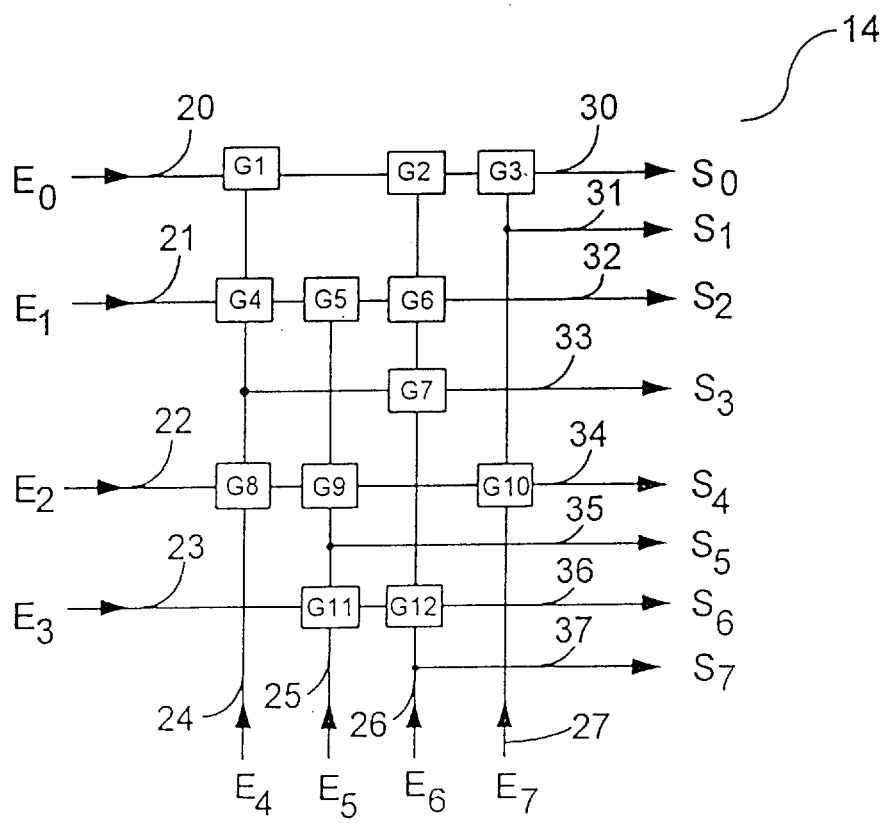

It can be shown that in $GF(2^n)$, we have $(a+b+ \ldots +z)^2 = a^2+b^2+ \ldots +z^2$. This property makes it possible to obtain a squaring device of little complexity in terms of components and hence a device that is compact. FIG. 2 shows an exemplary embodiment of the squaring device 14.

In the example described, namely for n=8, the Galois field generating polynomial is $x^8+x^4+x^3+x^2+1$. Any number can be represented as a linear combination of $1, x, x^2, \ldots, x^7$. The numbers produced by the squaring device may be represented as a linear combination of $1, x^2, x^4, \ldots, x^{14}$ with $x^8=x^4+x^3+x^2+1$, $x^{10}=x^6+x^5+x^4+x^2$, $x^{12}=x^7+x^6+x^3+x^2+1$, and $x^{14}=x^4+x+1$.

If $E_0, E_1, \ldots, E_7$ denote the bits of the numbers given to the squaring device at inputs 20, 21, . . . , 27 and $S_0, S_1, \ldots, S_7$ represent the bits of the numbers produced at outputs 30, 31, . . . , 37 from the input bits, it can be shown that:

$S_0 = E_0 \oplus E_4 \oplus E_6 \oplus E_7$, $S_1 = E_7$, $S_2 = E_1 \oplus E_4 \oplus E_5 \oplus E_6$, $S_3 = E_4 \oplus E_6$, $S_4 = E_2 \oplus E_4 \oplus E_5 \oplus E_7$, $S_5 = E_5$, $S_6 = E_3 \oplus E_5 \oplus E_6$, and $S_7 = E_6$ with $\oplus$ representing the XOR logic operation (shown in FIG. 2 by twelve logic gates G1 to G12). If a series type multiplier is used, then a parallel-input and series-output register is interposed between the squaring device and the multiplier. The register 12 is then chosen to be a series-input and parallel-output register.

In the method according to the invention, it is assumed that the application using it has available the number of cycles needed for the computation. If this is the case, the circuit that implements it takes up a smaller surface area and can be positioned and automatically routed more easily than is the case with a ROM MEMORY type approach.

What is claimed is:

1. A method to compute the result of the division, in a Galois field of $2^n = N$ elements, of a first number A by a second number B, these numbers being encoded on n bits, wherein said method comprises the following steps:

a—the production of a first intermediate number S(1) encoded on n bits by the squaring of the first number A, b—the production of a second intermediate number R(1) encoded on n bits by the multiplication of the first intermediate number S(1) by the second number B, c—the performance n−2 times of the steps a and b, the intermediate numbers produced by multiplication R(j), with j as an index that varies from 2 to n−1, being successively squared, and the intermediate numbers produced by squaring S(j) being successively multiplied by the second number B, and d—the production of the result S(n) by the squaring of the intermediate number R(n−1) produced by the [n−1]th multiplication.

2. A division circuit for the division, in a Galois field with $2^n = N$ elements, of a first number A by a second number B, these numbers being encoded on n bits, wherein said circuit comprises:

a squaring device receiving, from a multiplexing circuit, the first number A or a first intermediate number R(j) encoded on n bits obtained by the multiplication of exponents of the first and second number and producing a second intermediate number S(j) encoded on n bits, a multiplier to multiply the second intermediate number by the second number and to produce the first intermediate number, and a register to store the first or second intermediate number in order to isolate the squaring device and the multiplier.

3. A division circuit in accordance with claim 2 wherein said multiplexing circuit has one input for receiving the first number A.

4. A division circuit in accordance with claim 3 wherein said multiplexing circuit also has another input for receiving the first intermediate number R(j), and an output.

5. A division circuit in accordance with claim 4 wherein said multiplexer has one and another inputs and an output.

6. A division circuit in accordance with claim 5 wherein the first intermediate number R(j) is coupled from the output of the multiplier to the another input of the multiplexing circuit.

7. A division circuit in accordance with claim 6 wherein said register has an input and an output.

8. A division circuit in accordance with claim 7 wherein said squaring device has an input and an output.

9. A division circuit in accordance with claim 8 wherein the output of the multiplexing circuit connects to the input of the register.

10. A division circuit in accordance with claim 9 wherein the output of the register connects to the input of the squaring device.

11. A division circuit in accordance with claim 10 including an output terminal of the division circuit taken at the output of the squaring device.

12. A division circuit in accordance with claim 11 wherein the output of the squaring device connects to the one input of the multiplier.

13. A division circuit in accordance with claim 12 wherein the division circuit has a second number input that connects to the another input of the multiplier.

14. A division circuit in accordance with claim 8 wherein said register is connected between the output of the squaring device and said one input of the multiplier.

15. A division circuit in accordance with claim 2 wherein said squaring device is comprised of a matrix including a plurality of logic gates.

16. A division circuit in accordance with claim 2 wherein said multiplier is a series type multiplier.

17. A division circuit in accordance with claim 16 wherein said register is a parallel-input and a series-output register.

18. A division circuit in accordance with claim 2 wherein said register is a series-input and parallel output register.

19. A method to compute the result of division, in a Galois field of $2^n=N$ elements, of a first number A by a second number B, these numbers being encoded on n bits, wherein said method comprises the steps of:

a) squaring the first number A to provide a first intermediate number S(1);

b) multiplying the first intermediate number S(1) by the second number B to provide a second intermediate number R(1);

c) carrying out steps a) and b) n−2 times, with the intermediate numbers produced by multiplication R(j), with j as an index that varies from 2 to n−1, being successively squared, and the intermediate numbers produced by squaring S(j) being successively multiplied by the second number B, and d) squaring the intermediate number R(n−1) produced by the $[n-1]^{th}$ multiplication to provide the result S(n).

20. A method in accordance with claim 19 wherein the first intermediate number S(1) is encoded on n bits.

21. A method in accordance with claim 20 wherein the second intermediate number R(1) is encoded on n bits.

22. A division system for the division, in a Galois filed with $2^n=N$ elements, of a first number A by a second number B, these numbers being encoded on n bits, wherein said system comprises:

an input means for receiving the first number A and a first intermediate number R(j) encoded on n bits;

a squaring means coupled from said input means and providing a second intermediate number S(j) encoded on n bits;

a multiplier means coupled from the squaring means and adapted to multiply the second intermediate number by the second number to thus provide the first intermediate number; and a register means to store one of the first and second intermediate numbers.

23. A division system in accordance with claim 22 wherein the input means comprises a multiplexing means.

24. A division system in accordance with claim 23 wherein said squaring means comprises a squaring circuit receiving, from said multiplexing means, the first number A or the first intermediate number obtained by the multiplication of exponents of the first and second numbers.

25. A division system in accordance with claim 24 wherein said multiplexing means has one input for receiving the first number A.

26. A division system in accordance with claim 25 wherein said multiplexing means also has another input for receiving the first intermediate number R(j), and an output.

27. A division system in accordance with claim 26 wherein said multiplexer has one and another inputs and an output.

28. A division system in accordance with claim 27 wherein the first intermediate number R(j) is coupled from the output of the multiplier means to the another input of the multiplexing circuit.

29. A division system in accordance with claim 28 wherein said register means has an input and an output.

30. A division system in accordance with claim 29 wherein said squaring means has an input and an output.

31. A division system in accordance with claim 30 wherein the output of the multiplexing means connects to the input of the register means.

32. A division system in accordance with claim 31 wherein the output of the register means connects to the input of the squaring device.

33. A division system in accordance with claim 32 including an output terminal of the division system taken at the output of the squaring device.

34. A division system in accordance with claim 33 wherein the output of the squaring means connects to the one input of the multiplier means.

35. A division system in accordance with claim 34 wherein the division system has a second number input that connects to the another input of the multiplier means.

36. A division system in accordance with claim 35 wherein said register means is connected between the output of the squaring means and said one input of the multiplier means.

37. A division system in accordance with claim 24 wherein said squaring means is comprised of a matrix including a plurality of logic gates.

38. A division system in accordance with claim 24 wherein said multiplier means is a series type multiplier means.

39. A division system in accordance with claim 38 wherein said register means is a parallel-input and a series-output register means.

40. A division system in accordance with claim 24 wherein said register means is a series-input and parallel output register means.

* * * * *

UNITED STATES PATENT AND TRADEMARK OFFICE
CERTIFICATE OF CORRECTION

PATENT NO. : 5,890,800
DATED : April 6, 1999
INVENTOR(S) : Jacques Meyer

It is certified that error appears in the above-identified patent and that said Letters Patent is hereby corrected as shown below:

On the title page, item [73] should read:

Assignee: SGS-Thomson Microelectronics S.A., Gentilly, France

Signed and Sealed this

Thirty-first Day of October, 2000

*Attest:*

Q. TODD DICKINSON

*Attesting Officer*      *Director of Patents and Trademarks*